US008285630B2

(12) United States Patent
Drumma

(10) Patent No.: US 8,285,630 B2
(45) Date of Patent: Oct. 9, 2012

(54) COMPUTER-IMPLEMENTED SYSTEMS AND METHODS FOR BLOTTER SYNCHRONIZATION

(76) Inventor: Gregg A. Drumma, Arlington, MA (US)

( * ) Notice: Subject to any disclaimer, the term of this patent is extended or adjusted under 35 U.S.C. 154(b) by 640 days.

(21) Appl. No.: 12/267,073

(22) Filed: Nov. 7, 2008

(65) Prior Publication Data

US 2010/0100472 A1  Apr. 22, 2010

Related U.S. Application Data

(60) Provisional application No. 61/107,358, filed on Oct. 22, 2008.

(51) Int. Cl.
*G06Q 40/00* (2012.01)
(52) U.S. Cl. ............................. 705/37; 705/35; 705/36 R
(58) Field of Classification Search ................ 705/35, 705/36 R, 37
See application file for complete search history.

(56) References Cited

U.S. PATENT DOCUMENTS

| | | | |
|---|---|---|---|
| 2003/0149653 A1* | 8/2003 | Penney et al. | 705/37 |
| 2006/0190386 A1* | 8/2006 | Levy | 705/37 |
| 2008/0059846 A1* | 3/2008 | Rosenthal et al. | 714/100 |

OTHER PUBLICATIONS

Drumma, Gregg "Blotter Synchronization: Exposing Aggregated Liquidity to OMS Intelligence with Innovative FIX Workflow", FixGlobal The Electronic Trading Journal, vol. 2, Issue 5, Mar. 2008, pp. 29-33.

* cited by examiner

*Primary Examiner* — Lalita M Hamilton
(74) *Attorney, Agent, or Firm* — Jones Day

(57) ABSTRACT

Computer-implemented systems and methods are disclosed for synchronizing securities order information between an order management system and liquidity source computer systems. An order management system generates a securities order and communicates it to a blotter synchronization module. The blotter synchronization module communicates with liquidity source computer systems to indicate that the securities order is open for execution, and the liquidity source computer systems may respond to request permission to execute the securities order. The blotter synchronization module determines whether to select one of the liquidity source computer systems to execute the securities order.

19 Claims, 11 Drawing Sheets

COMPUTER-IMPLEMENTED SYSTEMS AND METHODS FOR BLOTTER SYNCHRONIZATION

CROSS-REFERENCE TO RELATED APPLICATION

This application claims priority to and the benefit of U.S. Provisional Application Ser. No. 61/107,358, (entitled "Computer-Implemented Systems and Methods for Blotter Synchronization" and filed on Oct. 22, 2008), of which the entire disclosure (including any and all figures) is incorporated herein by reference.

TECHNICAL FIELD

The technology described in this patent application relates generally to financial transactions, and more specifically to systems and methods for blotter synchronization.

BACKGROUND

Securities trading systems have been used to interact with multiple sources of liquidity. However as illustrated by the following examples, these systems exhibit significant drawbacks. FIG. 1 depicts at 100 a current type of order management system (OMS) environment. More specifically, it depicts an OMS environment, in which an OMS 110 interacts with multiple trading venues or liquidity source computer systems 120. The OMS 110 may interact with any or all of the liquidity source computer systems 120 in order to ensure execution of a securities order. However, the OMS 110 is restricted to placing an order at one liquidity source computer system 120 at a time, which limits the effectiveness of the OMS 110 in ensuring order execution.

FIG. 2 provides at 200 another example of an OMS 210, which is a limited single-choice system. In this example, after the OMS 210 has sent a securities order via the Financial Information eXchange (FIX) protocol to a destination liquidity source computer system (e.g., an execution management system (EMS) 220), the order is committed to the EMS 220. After analysis on the EMS 220, if a trader decides it is best to work instead with another liquidity source computer system (e.g., a direct market access (DMA)), the trader must cancel the securities order at the OMS 210 and then the securities order must be sent to the other liquidity source computer system. While a particular liquidity source computer system works the securities order, the other liquidity source computer systems 230 with which the OMS is able to interact are not made aware of the securities order. Alternately, even if the other systems 230 are aware of a particular securities order, they are prohibited from working the securities order while it is being worked by another liquidity source computer system.

As yet another example, FIG. 3 depicts at 400 an example data center at a buy-side securities trading operation. The example data center 400 includes an OMS 410 that is responsible for generating securities orders for the securities trading operation. OMS 410 is in communication with a back-end database 420 that stores securities order information for the securities trading operation. In addition, the data center 400 includes one or more liquidity source computer systems 430, which are co-located in the data center 400 to ensure speed and reliability. In operation, the liquidity source computer systems 430 have direct access to the back-end database 420. While some trading platforms/liquidity providers have developed interfaces into various OMS, they are all proprietary to the individual trading platforms/liquidity provider systems. Each generally follows the same type of interface: periodically check the OMS database directly for new/modified/deleted orders (known as "blotter scraping") and provide custom SQL procedures for trading.

Co-location of the liquidity source computer systems 430 in a trading operation's data center 400, and allowing the systems direct access to the back-end database 420 have been tolerated by trading operations because these steps ensure that the liquidity source computer systems 430 have the fastest possible access to securities order information that is generated by the OMS 410. However, permitting direct access to the back-end database 420 by the liquidity source computer systems 430 results in an overall operation that is not easily scalable, as each additional liquidity source computer system that is added to the data center 400 increases the load on the back-end database 420. In addition, permitting such direct access to the back-end database 420 makes it either impossible or far more difficult for the securities trading operation to limit access to data in the back-end database 420. For example, if the securities trading operation wished to limit a particular liquidity source computer system to accessing only international securities orders, the securities trading operation would have to take additional measures within the back-end database 420 to secure information that did not relate to international securities orders.

SUMMARY

In accordance with the teachings herein, computer-implemented systems and methods are provided to synchronize securities order information between an order management system and liquidity source computer systems. For example, a computer-implemented system and method can include an order management system (OMS), which generates a securities order and communicates it to a blotter synchronization module. The blotter synchronization module transmits messages to liquidity source computer systems indicating that the securities order is open for execution. In addition, the liquidity source computer systems may communicate with the blotter synchronization module to request permission to execute part or all of the securities order, and the blotter synchronization module determines whether to select one of the liquidity source computer systems to execute the securities order based upon pre-specified order approval criteria. If one of the liquidity source computer systems is selected based upon the pre-specified order approval criteria, the blotter synchronization module transmits a message to the selected liquidity source computer system giving it permission to execute the securities order.

As another example, a computer-implemented system and method can be configured with blotter synchronization in order to link a core trading application such as an OMS with multiple external trading platforms. Blotter synchronization allows orders that reside in the OMS to be published to multiple liquidity source computer systems simultaneously, allowing each connected system an opportunity for providing executing services. A central control application (OMS and blotter synchronization module) maintains state and communicates the state of the order blotter to each connected liquidity source computer system.

In this example, the Blotter synchronization provides an interface for external application to discover new/updated/delete order information, and provides the mechanisms for common actions involved with a trade such as placement, cancellation, corrections, and execution reporting on the trades.

Blotter synchronization allows the use of multiple trading platforms liquidity source computer systems without the need to manually move orders from the central OMS to other trading platforms. Due to the proliferation of trading venues, it is commonplace for a firm/trader to have multiple applications and/or sources of liquidity accessible to them in addition to their OMS. Blotter synchronization unifies all providers of trading liquidity, including but not limited to, execution management systems (EMS), direct market access applications (DMA), dark pools, and crossing networks, under a unified communication technology with the Order Management System.

An Order Management System enabled with blotter synchronization technology can opt to publish trades, which may also be referred to as blocks, in an uncommitted state to one or more selected liquidity source computer systems. Once published, these uncommitted orders cannot be executed within the external trading platforms/liquidity sources until those systems request a commitment using the blotter synchronization technology.

DETAILED DESCRIPTION

Figure 1:
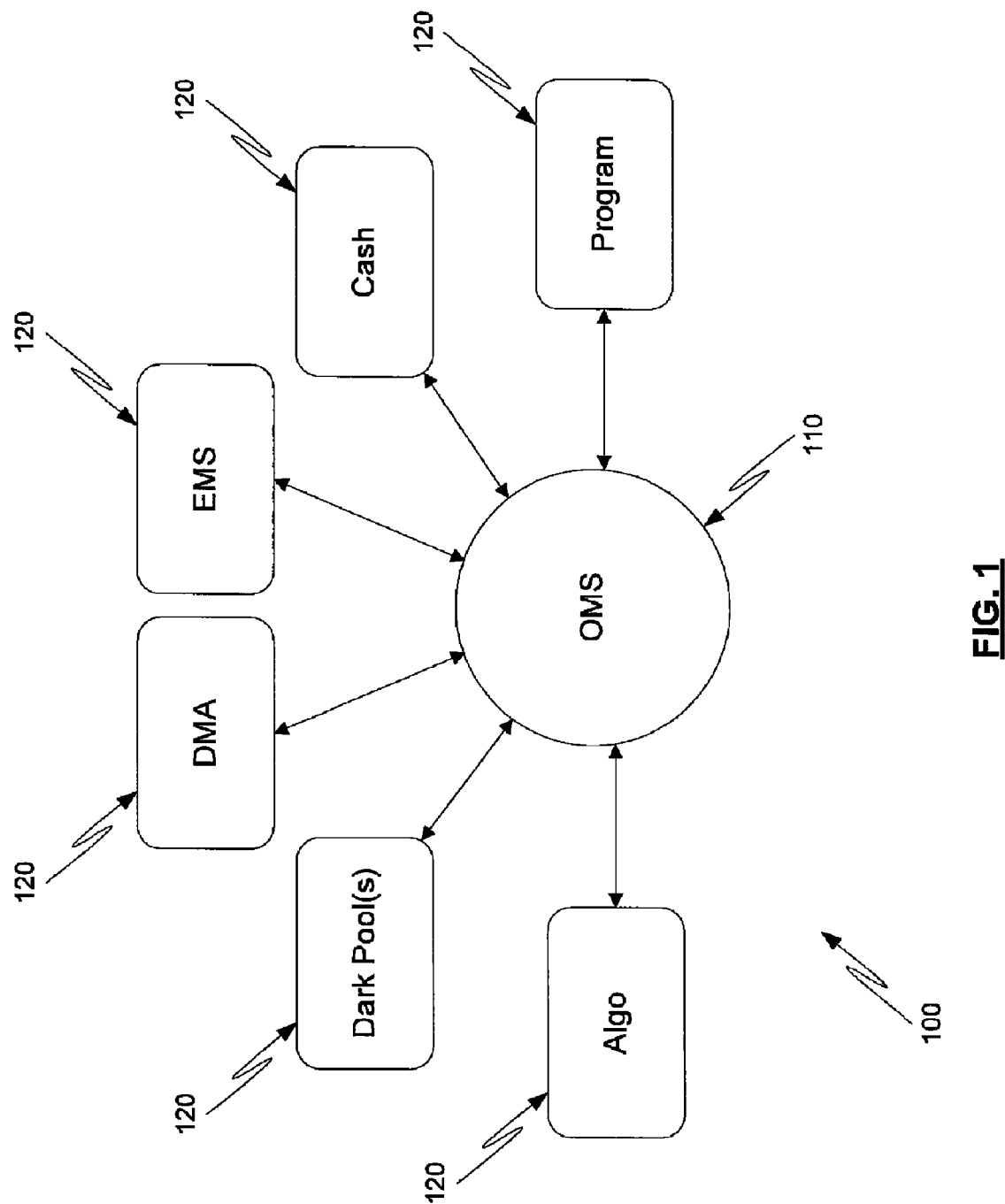
FIG. 1 is a block diagram depicting various liquidity source computer systems with which an order management system (OMS) may interact.
Figure 2:
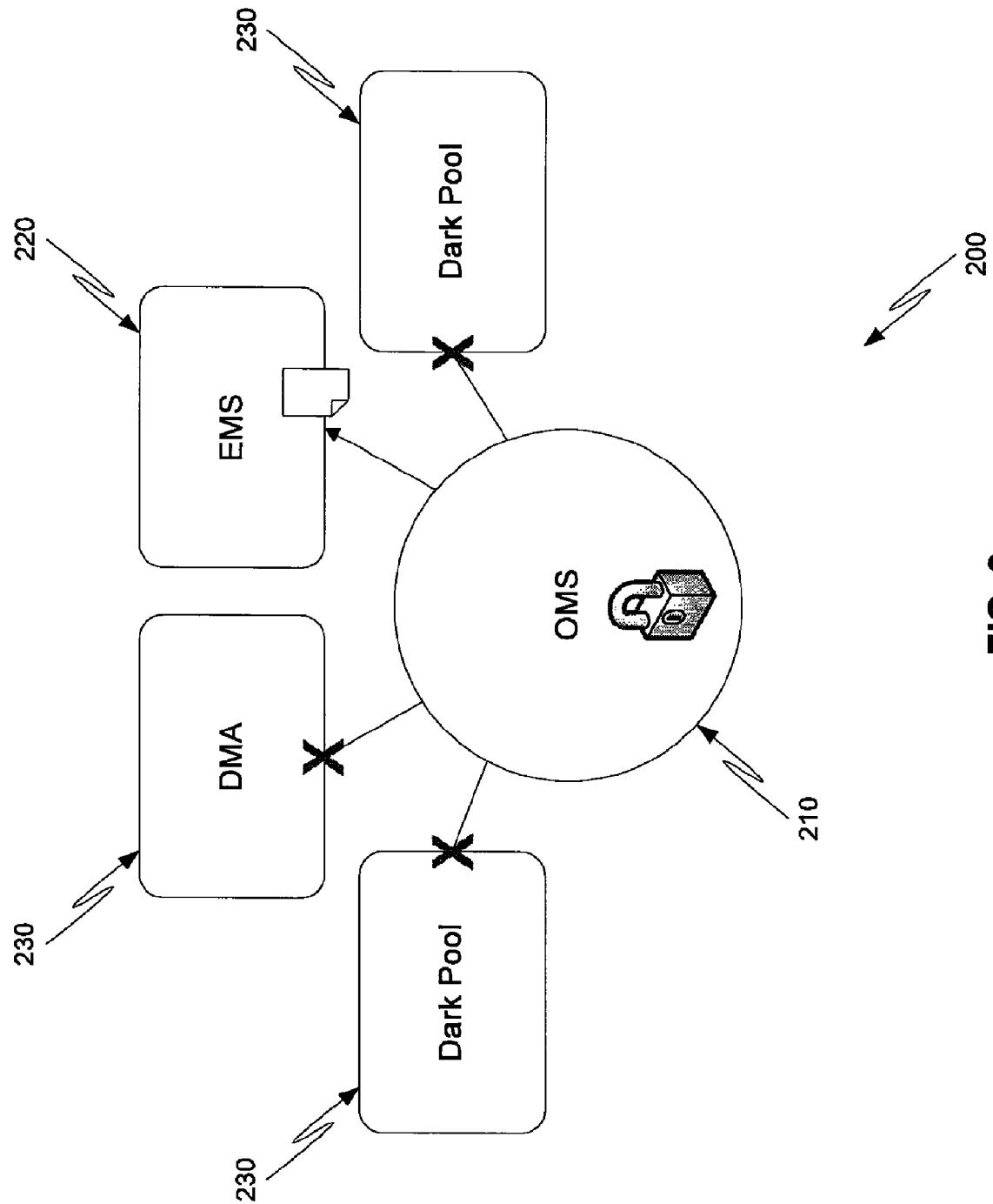
FIG. 2 is a block diagram depicting the interaction between an OMS and a single liquidity source computer system in prior art systems for executing securities transactions.
Figure 3:
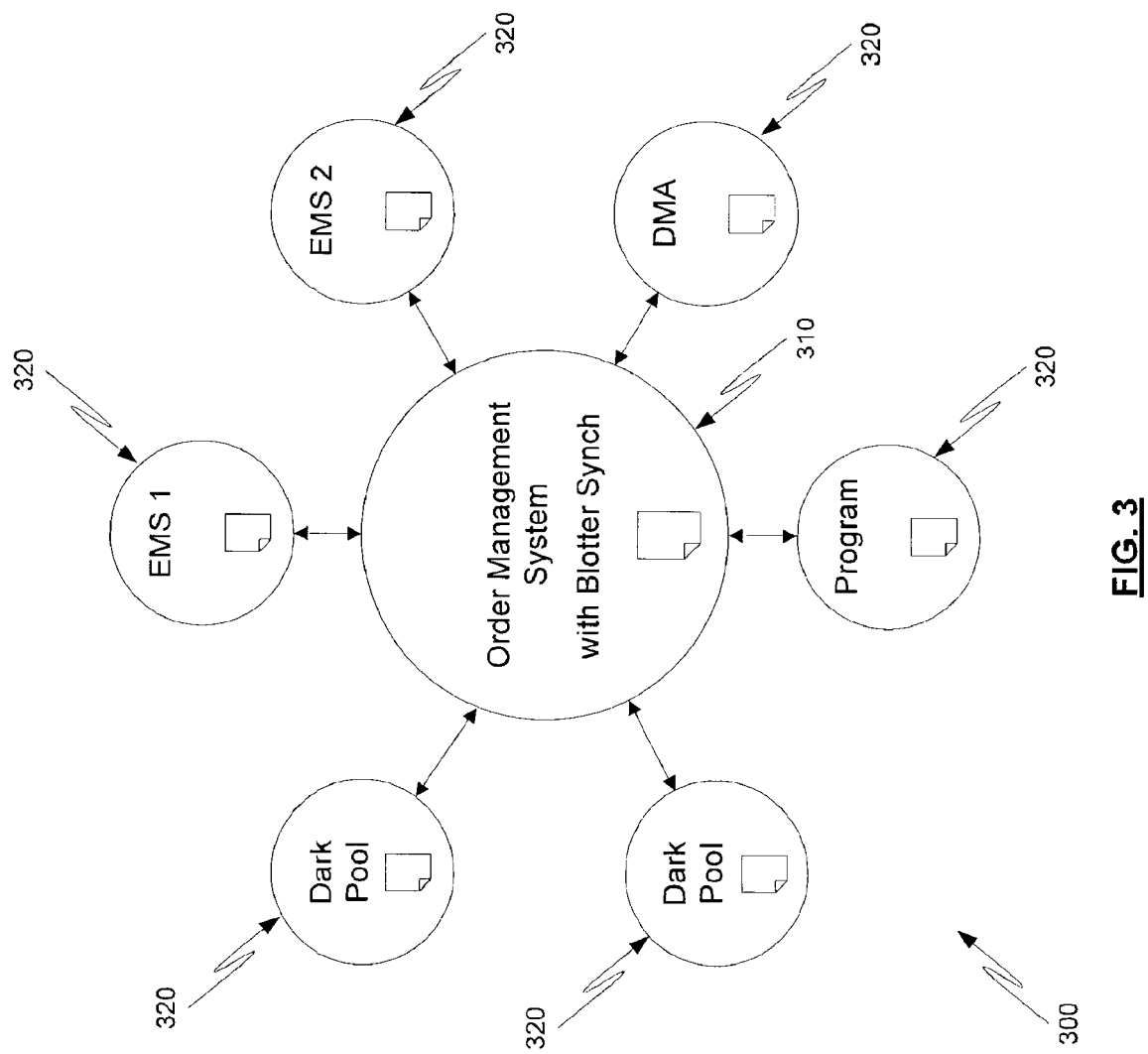
FIG. 3 is a block diagram depicting an example data center including a prior art OMS.
Figure 4:
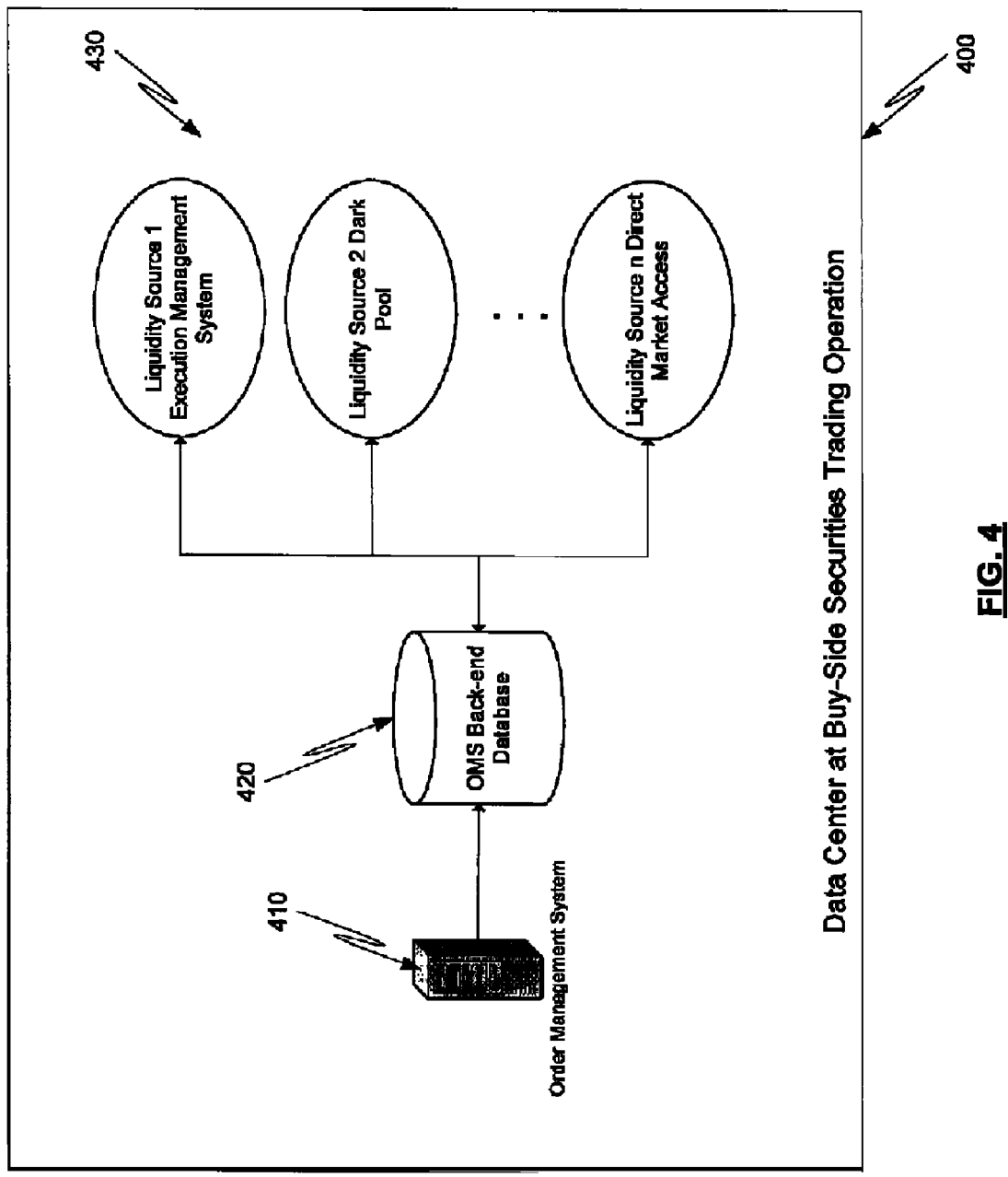
FIG. 4 is a block diagram depicting the interaction between an OMS including blotter synchronization and multiple liquidity source computer systems.

FIG. 4 depicts at 300 an OMS 310 that includes a blotter synchronization module. The OMS 310 interacts with various liquidity source computer systems 320. The blotter synchronization module permits the OMS 310 to push a securities order simultaneously to as many of the liquidity source computer systems 320 as the OMS wishes to. Thus, any number of the liquidity source computer systems 320 may work a securities order at the same time. Further action on a securities order may be initiated at any of the liquidity source computer systems 320. This results in an increased likelihood that the securities order will be executed. Additionally, broadening the sources of liquidity that are given the opportunity to work a securities order increases the likelihood that the OMS will execute the securities order on the best available terms.

Figure 5:
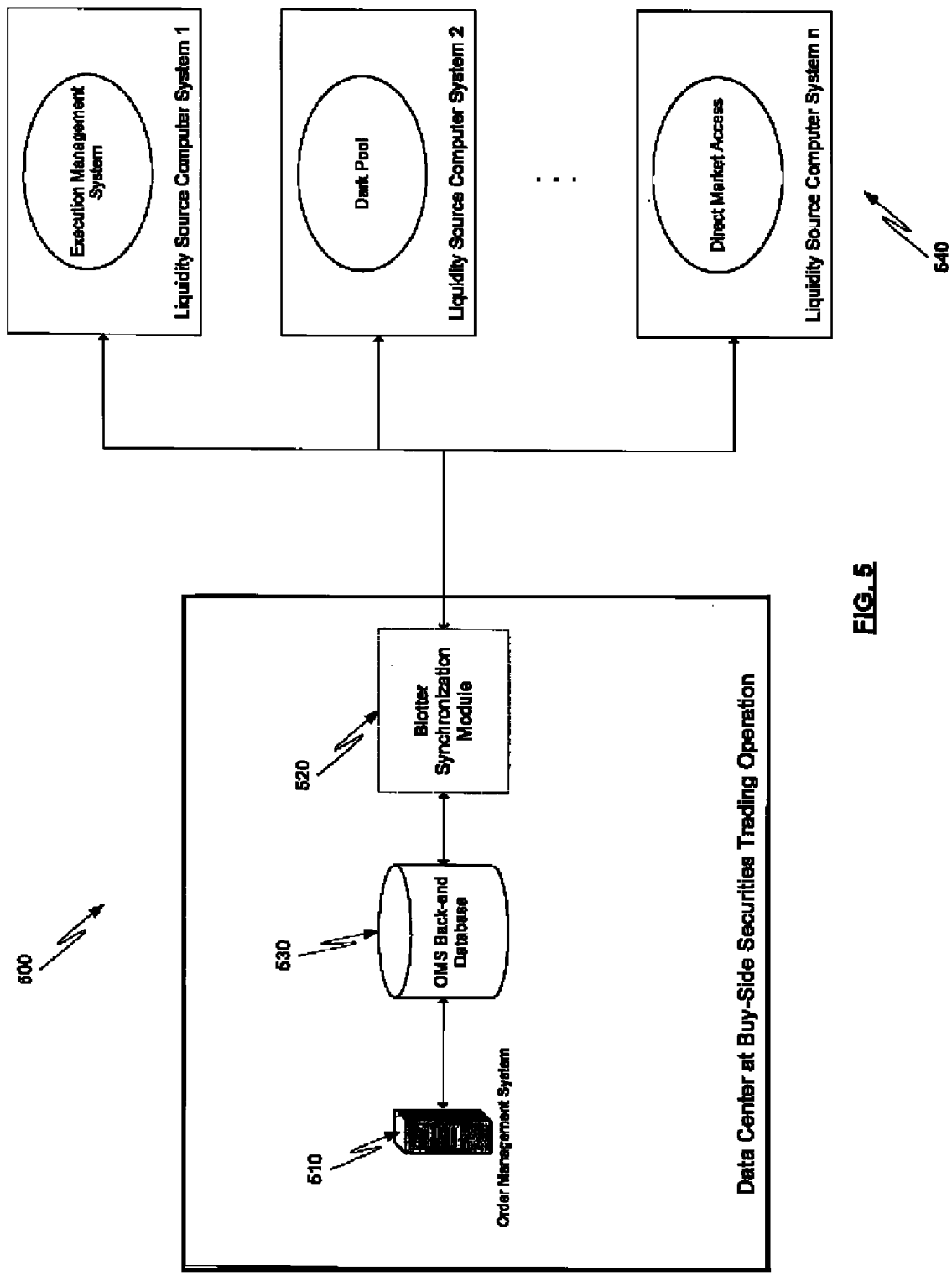
FIG. 5 is a block diagram depicting an example data center including an OMS and a blotter synchronization module.

FIG. 5 depicts at 500 the operation of a trading architecture including an OMS 510 and a blotter synchronization module 520. The OMS 510 and the blotter synchronization module 520 are in communication with each other via the back-end database 530. More specifically, the OMS 510 communicates with a back-end database 530 that stores securities order information. The blotter synchronization module 520 also accesses the back-end database 530. Further, the blotter synchronization module is responsible for interacting with various liquidity source computer systems 540, including publishing securities order information and receiving requests from the liquidity source computer systems 540 for placement of securities orders. The blotter synchronization module 520 accesses the back-end database 530 to determine what securities order information has been generated by the OMS 510 and what securities order information should be published to one or more of the liquidity source computer systems 540.

By acting as an intermediary between the liquidity source computer systems 540 and the OMS 510, the blotter synchronization module 520 permits greater scalability of a securities order processing architecture, as the inclusion of additional liquidity source computer systems in the architecture does not result in an increased load on the back-end database 530. In addition, because the blotter synchronization module may communicate with the liquidity source computer systems over a network link, such as a local area network (LAN) or a wide area network (WAN), the liquidity source computer systems no longer must be co-located at the data center of the securities trading operation, as the systems no longer need direct access to the back-end database 530. In this way, physical security of the data center may be improved.

Figure 6:
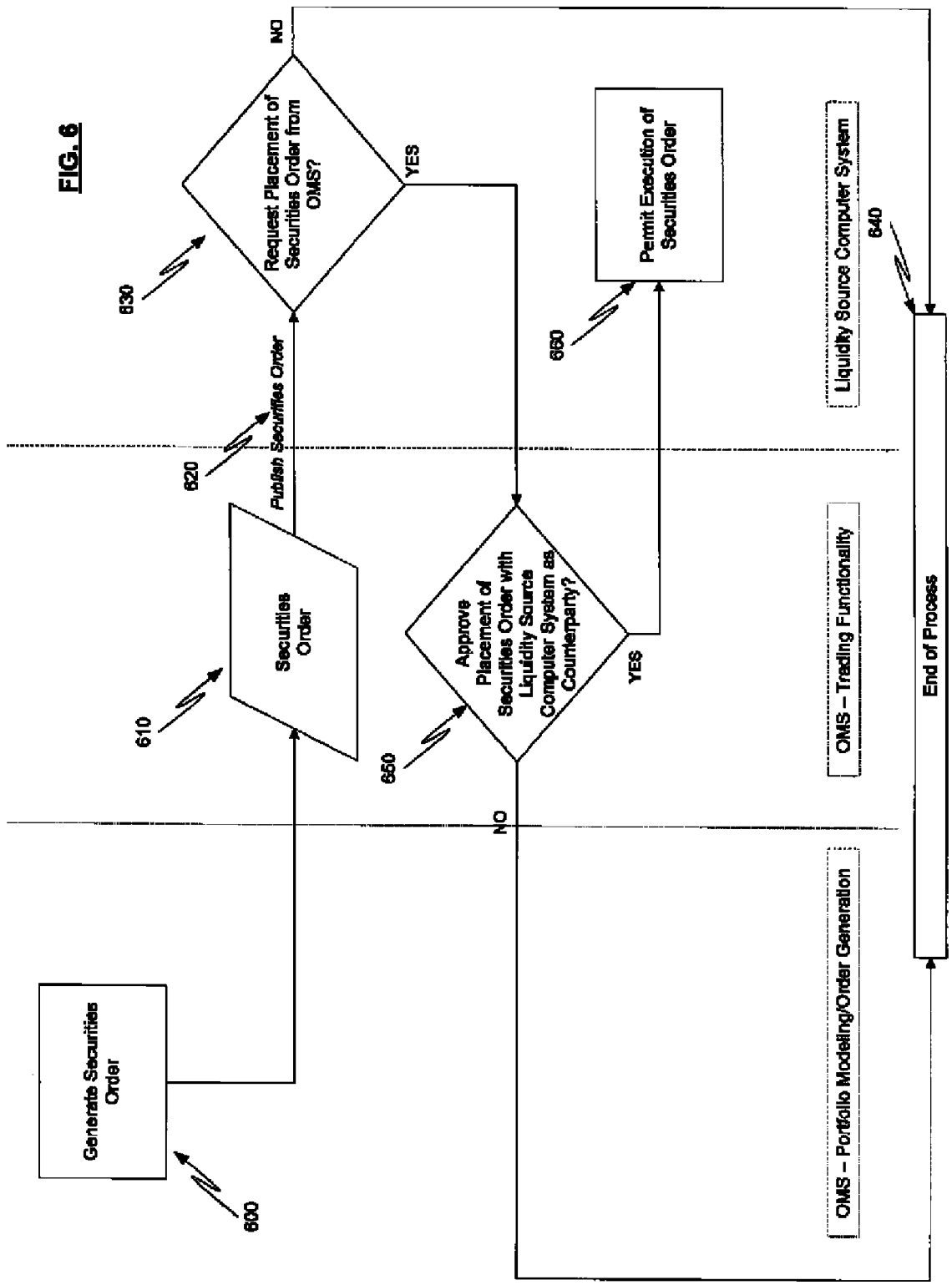
FIG. 6 is a flow diagram depicting an example process for synchronizing securities order information between an OMS, a blotter synchronization module, and an example liquidity source computer system.

FIG. 6 is a flow diagram depicting an example work flow of a securities trading architecture including an OMS and a blotter synchronization module. At 600, the portfolio modeling/order generation functionality of the OMS creates a securities order 610. At 620, the securities order is published to one or more liquidity source computer systems. At 630, the example liquidity source computer system determines whether to request placement of the securities order from the OMS. If the liquidity source computer system decides not to request placement of the securities order from the OMS, then the process ends 640. On the other hand, if the liquidity source computer system does request placement of the securities order, a request is sent back to the trading functionality of the OMS. In this way, if the OMS receives multiple requests for placement of the securities order from multiple liquidity source computer systems, the OMS may determine which of the liquidity source computer systems is the best choice to permit to execute the securities order. Thus, for each liquidity source computer system that requests placement, the OMS decides whether to approve placement of the order with the liquidity source computer system. If the OMS does not approve placement of the order, then the process ends 640. If the OMS does approve placement of the order, the OMS communicates to the example liquidity source computer system that it is permitted to execute the securities order 660.

Figure 7:
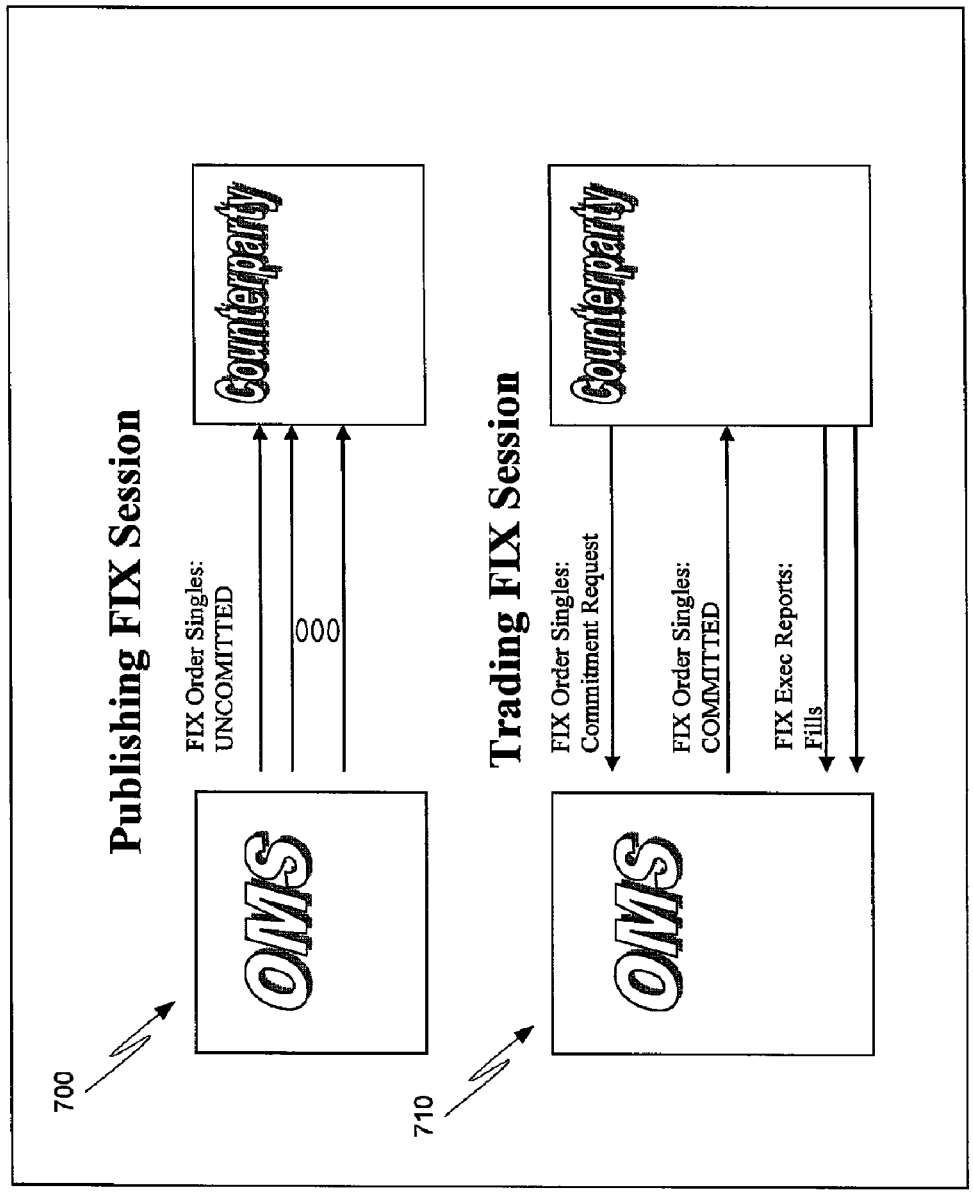
FIG. 7 is a block diagram depicting an example securities transaction between a prior art OMS and a liquidity source computer system.

FIG. 7 depicts how blotter synchronization may be used in a single "FIX" session or split into two separate sessions (e.g., the publishing "FIX" session 700) which publishes blotter activity in the OMS, and the trading FIX session 710, which handles trading negotiations messaging (e.g., Commitment Requests, Corrections, Fills, Cancels). It is noted that the "FIX" protocol is an extensible industry standard protocol for communicating information about financial transactions between parties. As described herein, use of the FIX protocol, and extensions thereto, for message passing in a securities trading architecture allows for easier uptake of a given technology, due to the familiarity in the technical area of financial transaction processing with the FIX protocol. Typically, a user can send an order from an OMS into another trading platform/liquidity source using the FIX protocol. This effectively creates a "placement" in the OMS which prevents an order from being worked elsewhere. The common term for this workflow is a "staged order" or "staging." Once an order has been staged via FIX into another system, the OMS and all other connected system can no longer take action on this order. The order belongs to the targeted trading venue.

Figure 8:
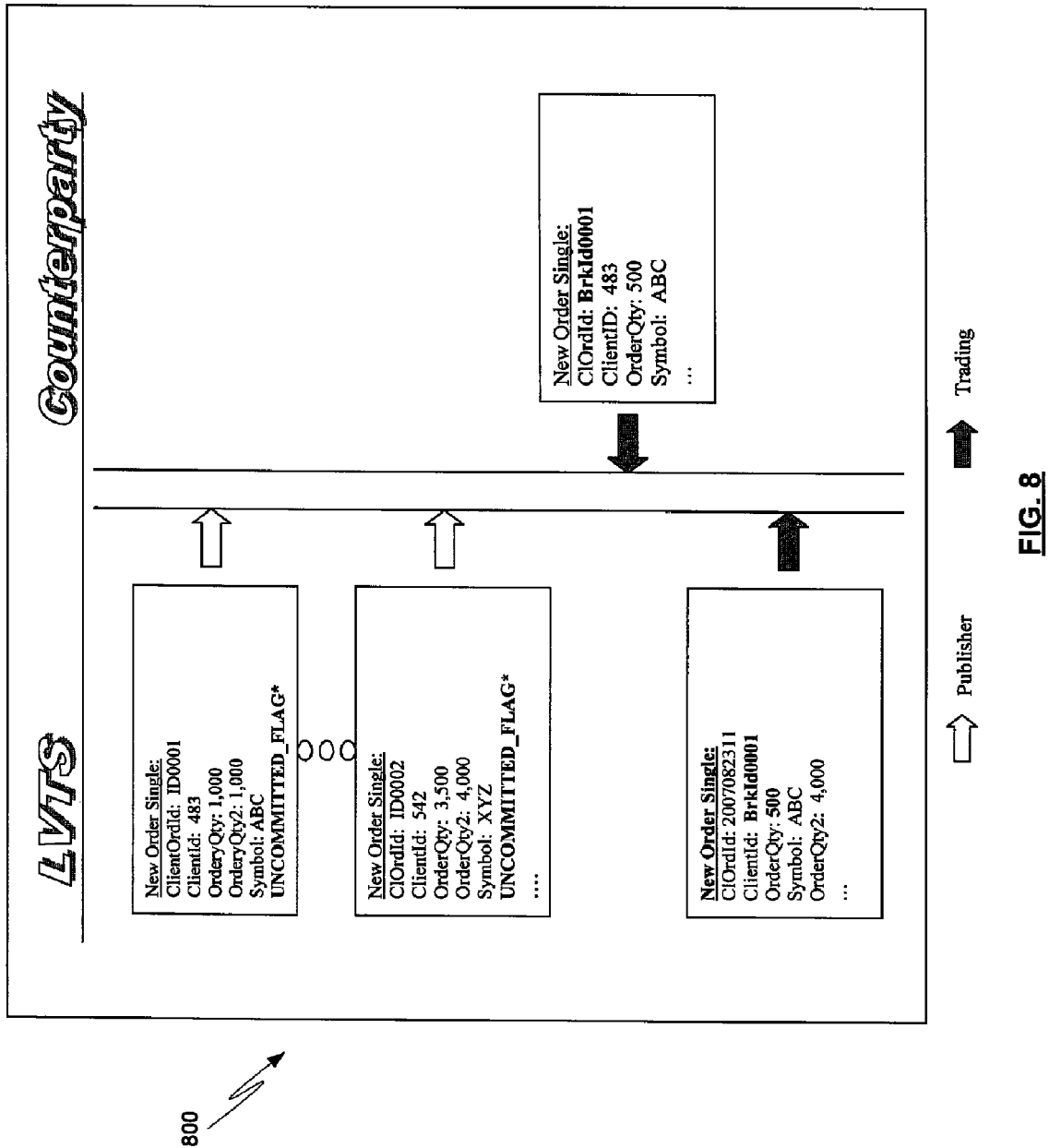
FIGS. 8-11 are flow diagrams depicting example communications between a blotter synchronization module and a liquidity source computer system.

FIG. 8 depicts at 800 an example communication between a blotter synchronization module and a liquidity source computer system. Specifically, it shows an example request for a commitment/placement by a counterparty. In this example, the result is a positive (accepted) response from the blotter synchronization-enabled OMS (referred to here as the LVTS). The communications from the LVTS publishing the securities order information includes the uncommitted flag, which indicates to the counterparty receiving the securities order information that the counterparty must request permission before the securities order may be executed. In this way, consistency may be guaranteed, so that a single securities order is not executed by multiple counterparties. Once the counterparty has communicated to the LVTS the counterparty's desire to execute a particular order, the LVTS must communicate back to the counterparty permission to execute the securities order, as shown.

Figure 9:
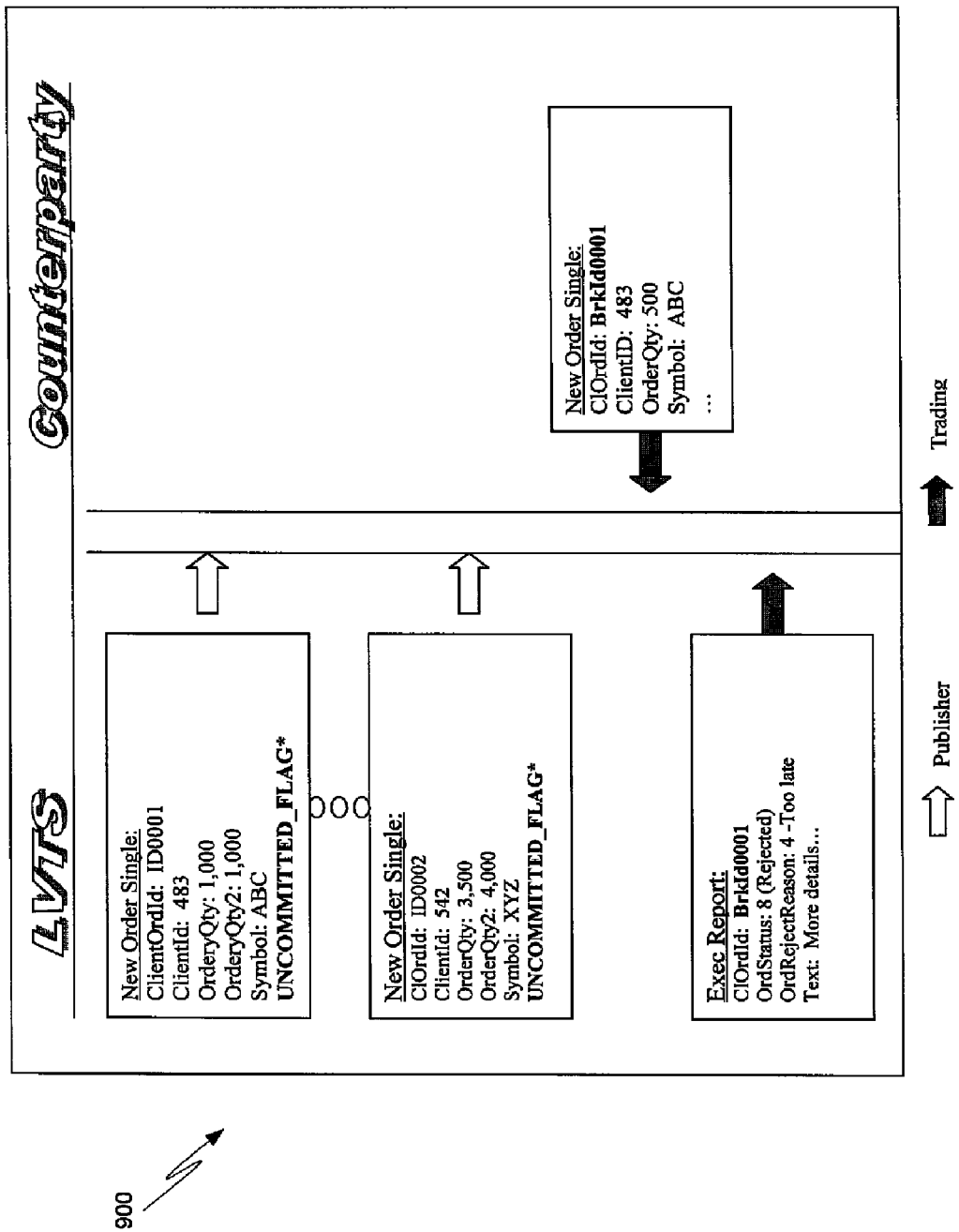

FIG. 9 depicts at 900 another example communication between a blotter synchronization module and a liquidity source computer system. In this example, securities order information is again published to the counterparty by the LVTS. However, in this case, when the counterparty requests permission from the LVTS to execute the securities order, the response from the LVTS is negative (rejected). A reason is returned to the counterparty along with the message that the request for permission to execute was rejected. In the example, the reason is "too late," an indication that the counterparty's request for permission to execute arrived too late, perhaps because another counterparty requested permission to execute first and was granted that permission, or because the order was withdrawn prior to being executed.

Figure 10:
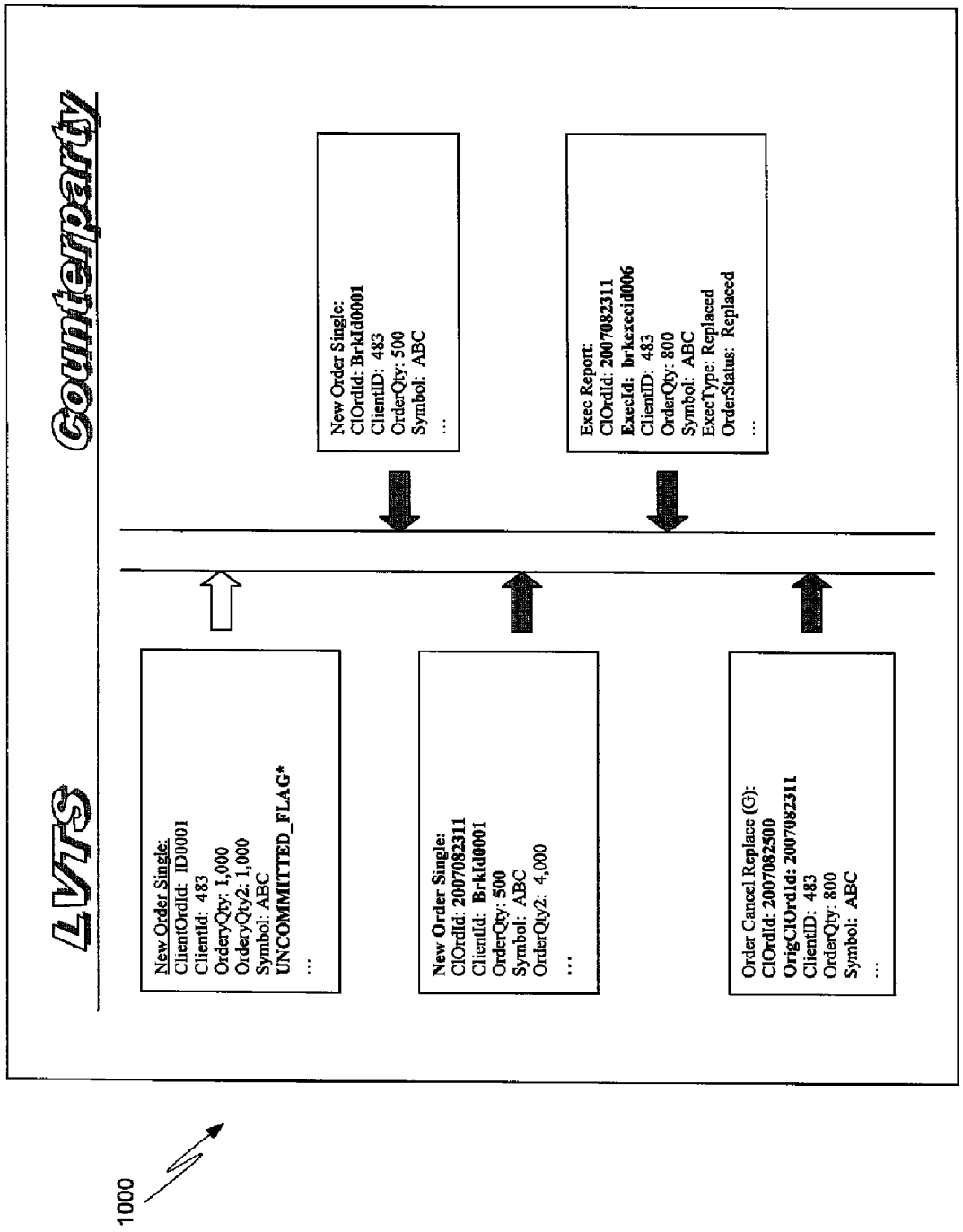

FIG. 10 depicts at 1000 another example communication between a blotter synchronization module and a liquidity source computer system. In this example, the counterparty attempts to correct a mistake made in the counterparty's first request for permission to execute. Initially, after receiving the securities order information from the LVTS, the counterparty requests permission to execute the securities order for 500 shares of the 4000 shares included in the LVTS-published order. The LVTS responds to this request with permission for the counterparty to execute the order for 500 shares. After the counterparty receives the message from LVTS indicating the counterparty has permission to execute, but before the order is executed, the counterparty sends a message to the LVTS requesting replacement of its initial request for permission to execute 500 shares with a request for permission to execute 800 shares. The LVTS receives the request for replacement and decides to permit the counterparty to execute the order for 800 shares. Thus, the LVTS sends back another message indicating that the counterparty has permission to execute the securities order, this time for 800 shares. The original 500-share request and permission is therefore replaced by the 800-share request and permission.

Figure 11:
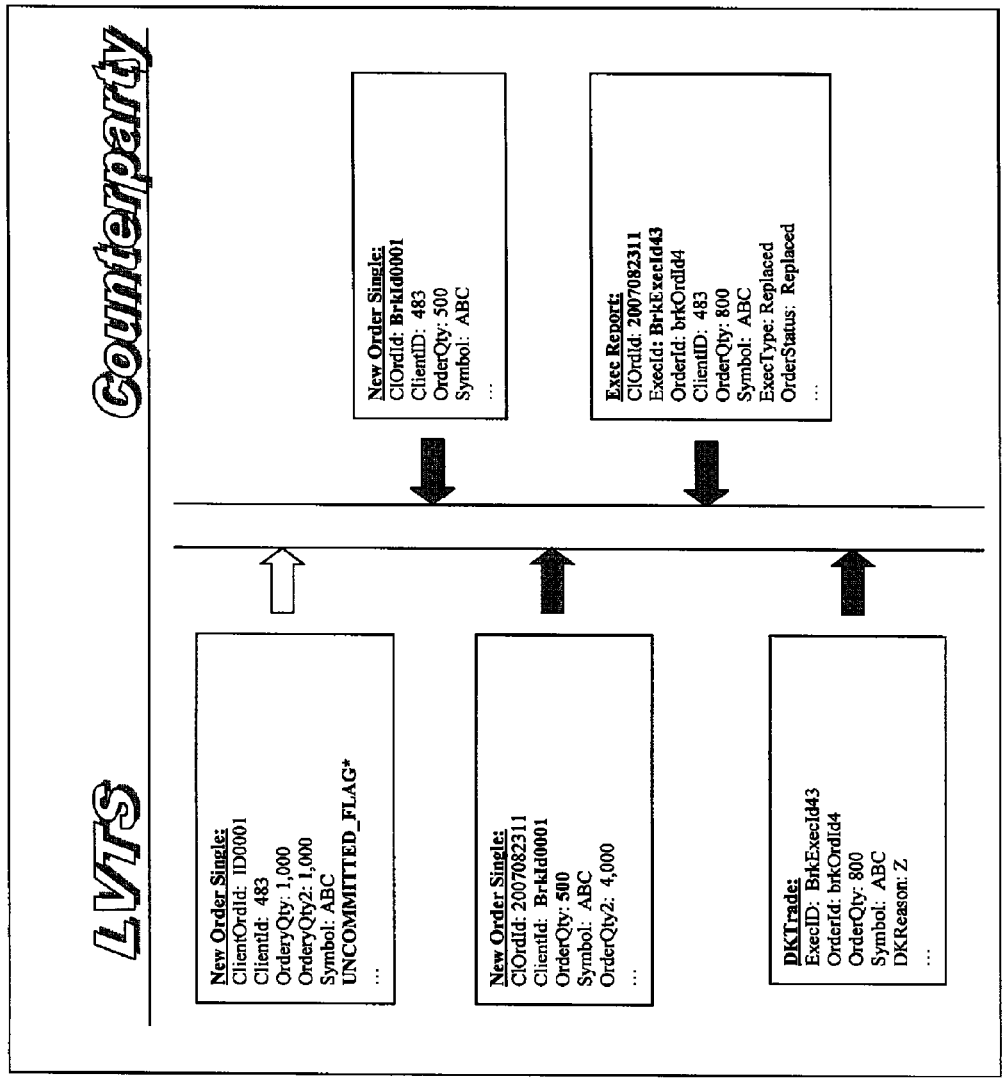

FIG. 11 depicts at 1100 another example communication between a blotter synchronization module and a liquidity source computer system. In this example, the counterparty again requests replacement of its initial request for permission to execute 500 shares of the securities order with a request for permission to execute 800 shares of the securities order. In this example, though, the LVTS declines to replace the 500-share permission with an 800-share permission. Thus, the LVTS sends a message to the counterparty indicating that the LVTS will not replace the initial request. In this case, the 500-share permission remains active, and the counterparty remains able to decide whether to execute the 500-share order or to request instead that the LVTS cancel the 500-share permission.

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting.

It is further noted that the systems and methods may be implemented on various types of computer architectures, such as for example on a workstation or on a networked system, or in a client-server configuration, or in an application service provider configuration.

In multiple computer or processor systems, data signals may be conveyed via networks (e.g., local area network, wide area network, internet, combinations thereof, etc.), fiber optic medium, carrier waves, wireless networks, etc. for communication among multiple computers or computing devices. Data signal(s) can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for synchronizing securities order information between an order management system and a plurality of liquidity source computer systems, said method comprising:
   at the order management system, generating a securities order;
   communicating the securities order to a blotter synchronization module;
   transmitting messages via a network from the blotter synchronization module to the plurality of liquidity source computer systems indicating that the securities order is open for execution;
   receiving over the network at the blotter synchronization module a message from one or more of the liquidity source computer systems requesting permission to execute part or all of the securities order;
   determining at the blotter synchronization module whether to select one of the liquidity source computer systems to execute the securities order based upon pre-specified order approval criteria; and
   if the blotter synchronization module determines to select a liquidity source computer system based upon said determining step, then transmitting a message to the selected liquidity source computer system indicating that the selected liquidity source computer system has permission to execute the securities order;
   wherein direct access by the liquidity source computer systems to internal aspects of the order management system is restricted.

2. The method of claim 1, wherein the messages indicating that the securities order is open for execution include a flag indicative of the fact that the liquidity source computer systems must request permission from the order management system before executing the securities order.

3. The method of claim 2, wherein the transmitted and received messages comply with the Financial Information eXchange (FIX) protocol and extensions thereto.

4. The method of claim 1, further comprising:
   if the order management system determines that the securities order should not be executed with certain of the liquidity source computer systems, then transmitting a message to the certain liquidity source computer systems indicating that the securities order is no longer open for execution.

5. The method of claim 1, wherein the blotter synchronization module is configured to exclude one or more of the liquidity source computer systems when transmitting the messages indicating that the securities order is open for execution.

6. The method of claim 1, wherein the pre-specified order approval criteria includes a requirement of user approval for execution of the securities order, said determining step comprising:
   requesting that a user of the order management system select from a group of one or more securities order execution alternatives in order to determine how the securities order is to be executed.

7. The method of claim 1, wherein the restriction of direct access by the liquidity source computer systems to internal aspects of the order management system permits greater scalability of the order management system.

8. The method of claim 1, wherein the restriction of direct access by the liquidity source computer systems to internal aspects of the order management system increases security of the order management system.

9. The method of claim 1, wherein the network is a wide-area network (WAN).

10. A computer-implemented system for synchronizing securities order information between an order management system and a plurality of liquidity source computer systems, wherein a securities order is generated at the order management system, said system comprising:
    software instructions configured to operate on one or more data processors and to receive the securities order from the order management system;
    software instructions configured to operate on the one or more data processors and to transmit messages via a network to the plurality of liquidity source computer systems indicating that the securities order is open for execution;
    software instructions configured to operate on the one or more data processors and to receive over the network a message from one or more of the liquidity source computer systems requesting permission to execute part or all of the securities order;
    software instructions configured to operate on the one or more data processors and for determining whether to select one of the liquidity source computer systems to execute the securities order based upon pre-specified order approval criteria; and
    software instructions configured to operate on the one or more data processors and to transmit a message to the selected liquidity source computer system indicating that the one of the selected liquidity source computer system has permission to execute the securities order;
    wherein direct access by the liquidity source computer systems to internal aspects of the order management system is restricted.

11. The system of claim 10, wherein the messages indicating that the securities order is open for execution include a flag indicative of the fact that the liquidity source computer systems must request permission from the order management system before executing the securities order.

12. The system of claim 11, wherein the transmitted and received messages comply with the Financial Information eXchange (FIX) protocol and extensions thereto.

13. The system of claim 10, further comprising:
    software instructions configured to operate on the one or more data processors and to determine that the securities order should not be executed with certain of the liquidity source computer systems;
    software instructions configured to operate on the one or more data processors and to transmit a message to the certain liquidity source computer systems indicating that the securities order is no longer open for execution.

14. The system of claim 10, further comprising:
software instructions configured to operate on the one or more data processors and to exclude one or more of the liquidity source computer systems when transmitting the messages indicating that the securities order is open for execution.

15. The system of claim 10, further comprising:
software instructions configured to operate on the one or more data processors and to request that a user of the system select from a group of one or more securities order execution alternatives in order to determine how the securities order is to be executed;
wherein a response to the user request comprises one of the pre-specified order approval criteria.

16. The system of claim 10, wherein the restriction of direct access by the liquidity source computer systems to internal aspects of the order management system permits greater scalability of the order management system.

17. The system of claim 10, wherein the restriction of direct access by the liquidity source computer systems to internal aspects of the order management system increases security of the order management system.

18. The system of claim 10, wherein the network is a wide-area network (WAN).

19. A computer-readable storage medium encoded with instructions capable of causing a computer to perform a method for synchronizing securities order information between an order management system and a plurality of liquidity source computer systems, said method comprising:

at the order management system, generating a securities order;

communicating the securities order to a blotter synchronization module;

transmitting messages via a network from the blotter synchronization module to the plurality of liquidity source computer systems indicating that the securities order is open for execution;

receiving over the network at the blotter synchronization module a first message from one or more of the liquidity source computer systems requesting permission to execute part or all of the securities order;

determining at the blotter synchronization module whether to select one of the liquidity source computer systems to execute the securities order based upon pre-specified order approval criteria; and if the blotter synchronization module determines to select the one of the liquidity source computer systems based upon said determining step, then transmitting a second message to the one of the liquidity source computer systems indicating that the one of the liquidity source computer systems has permission to execute the securities order;

wherein direct access by the liquidity source computer systems to internal aspects of the order management system is restricted.

* * * * *